US012503252B2

(12) United States Patent
Tian et al.

(10) Patent No.: US 12,503,252 B2
(45) Date of Patent: Dec. 23, 2025

(54) METHOD FOR AUTONOMOUS MISSION PLANNING OF CARBON SATELLITE

(71) Applicants: INNOVATION ACADEMY FOR MICROSATELLITES OF CAS, Shanghai (CN); SHANGHAI ENGINEERING CENTER FOR MICROSATELLITES, Shanghai (CN)

(72) Inventors: Longfei Tian, Shanghai (CN); Zengshan Yin, Shanghai (CN); Guohua Liu, Shanghai (CN); Denghui Hu, Shanghai (CN); Wenjuan Gu, Shanghai (CN); Shuang Gao, Shanghai (CN); Zeying Dong, Shanghai (CN); Xiaosong Yao, Shanghai (CN); Dinghui Shang, Shanghai (CN)

(73) Assignees: INNOVATION ACADEMY FOR MICROSATELLITES OF CAS, Shanghai (CN); SHANGHAI ENGINEERING CENTER FOR MICROSATELLITES, Shanghai (CN)

( * ) Notice: Subject to any disclaimer, the term of this patent is extended or adjusted under 35 U.S.C. 154(b) by 319 days.

(21) Appl. No.: 18/280,241

(22) PCT Filed: Jul. 12, 2021

(86) PCT No.: PCT/CN2021/105698
§ 371 (c)(1),
(2) Date: Sep. 4, 2023

(87) PCT Pub. No.: WO2023/283754
PCT Pub. Date: Jan. 19, 2023

(65) Prior Publication Data
US 2024/0140619 A1 May 2, 2024

(51) Int. Cl.
*B64G 1/24* (2006.01)
*B64G 1/10* (2006.01)

(52) U.S. Cl.
CPC ............ *B64G 1/247* (2023.08); *B64G 1/1021* (2013.01)

(58) Field of Classification Search
CPC ...... B64G 1/1021; B64G 1/1028; B64G 1/24; B64G 1/242; B64G 1/244; B64G 1/247;
(Continued)

(56) References Cited

U.S. PATENT DOCUMENTS

2004/0158832 A1 8/2004 Chechik et al.
2006/0177137 A1* 8/2006 Friedhoff ............... G06V 10/60
382/199

(Continued)

FOREIGN PATENT DOCUMENTS

CN 106570614 4/2017
CN 109214564 1/2019
(Continued)

OTHER PUBLICATIONS

English Translation of CN-113327028-A (Year: 2021).*
(Continued)

*Primary Examiner* — Jonathan M Dager
*Assistant Examiner* — Aaron K Mccullers
(74) *Attorney, Agent, or Firm* — JCIPRNET

(57) ABSTRACT

The present invention discloses a method for autonomous mission planning of Carbon Satellite, which triggers autonomous mission planning for the satellite when it detects the satellite switching from a shadow area to a light area, comprising: determining planning time sequence, wherein the planning time sequence comprise several time nodes; and then, for each time node, carrying out a prediction of the ground attributes of the sub-satellite point, and setting
(Continued)

observation arc segment according to the prediction result; and finally, determining the load power-on-off time sequence according to the observation arc segment.

10 Claims, 2 Drawing Sheets

(58) Field of Classification Search
CPC ...... G06Q 10/04; G06Q 10/063; G06Q 50/26; Y02A 90/10
USPC ................................ 701/13, 531; 244/158.6
See application file for complete search history.

(56) References Cited

U.S. PATENT DOCUMENTS

| | | | |
|---|---|---|---|
| 2014/0270502 A1* | 9/2014 | Leonard | G06T 5/73 382/165 |
| 2017/0090017 A1* | 3/2017 | Lenes | G01N 33/1833 |
| 2018/0172823 A1 | 6/2018 | Tyc | |
| 2020/0361637 A1* | 11/2020 | Admani | B64G 1/66 |

FOREIGN PATENT DOCUMENTS

| | | | | |
|---|---|---|---|---|
| CN | 110795214 | | 2/2020 | |
| CN | 111461508 | | 7/2020 | |
| CN | 111598407 | | 8/2020 | |
| CN | 109214564 B | | 9/2020 | |
| CN | 111967734 | | 11/2020 | |
| CN | 113327028 A | * | 8/2021 | ......... G06Q 10/0637 |
| CN | 110795214 B | | 8/2022 | |
| CN | 111967734 B | | 8/2023 | |

OTHER PUBLICATIONS

"International Search Report (Form PCT/ISA/210) of PCT/CN2021/105698," mailed on Mar. 28, 2022, with English translation thereof, pp. 1-6.

* cited by examiner

METHOD FOR AUTONOMOUS MISSION PLANNING OF CARBON SATELLITE

CROSS-REFERENCE TO RELATED APPLICATION

This application is a 371 of international application of PCT application serial no. PCT/CN2021/105698, filed on Jul. 12, 2021. The entirety of the above mentioned patent applications is hereby incorporated by reference herein and made a part of this specification.

TECHNICAL FIELD

The present invention relates to the field of aerospace technology, and in particular to a method for autonomous mission planning of Carbon Satellite.

BACKGROUND

In order to know the distribution of global carbon dioxide concentration, China has successfully launched the Global Carbon Dioxide Monitoring Scientific Experiment Satellite, or Carbon Satellite for short. When in orbit, the Carbon Satellite can utilize nadir observation to obtain the concentration of carbon dioxide columns over land and flare observation to obtain the concentration of carbon dioxide columns over the ocean.

During the nadir observation period, due to the signal-to-noise ratio at the sea surface does not meet the observation requirements, the observation data over the ocean is invalid data; therefore, the final valid data obtained by the Carbon Satellite nadir observation mode need to remove the invalid data of the ocean.

However, the Carbon Satellites themselves cannot carry out selective power-on observations according to the ground attributes (ocean or land) of the sub-satellite point; instead, they use the whole orbit of the light area for power-on observations, and after the observation data have been transmitted down to the ground, the invalid data of the ocean are eliminated by the ground processing system. Since the ocean area accounts for 71 percent of the total area of the Earth's surface, this leads to a great waste of satellite storage, energy, data transmission resources and ground reception, storage and processing resources.

SUMMARY

Aiming at some or all of the problems in the prior art, the present invention provides a method for autonomous mission planning of Carbon Satellite, which triggers autonomous mission planning for the satellite when it detects the satellite switches from a shadow area to a light area, the autonomous mission planning for the satellite comprising:
  Determining planning time sequence, the planning time sequence comprise several time nodes;
  For each time node, carrying out a prediction of the ground attributes of the sub-satellite point, and setting observation arc segment according to the prediction result; and
  Determining the load power-on-off time sequence according to the observation arc segment.
Furthermore, detecting the satellite switches from the shadow area to the light area comprises:
  When the continuous duration of detecting that the angle between the sun vector and the geocentric vector is greater than the critical angle between light and shadow exceeds the specified value, it is judged that the satellite switches from the shadow area to the light area.

Furthermore, determining the planning time sequence comprise:
  Setting the time point after the first preset time of switching the satellite from the shadow area to the light area as the initial time node; and
  From the initial time node, setting the time point after the second preset time as the second time node, and so on, setting the time nodes in the planning time sequence until the satellite leaves the observable arc segment.
Furthermore, the first preset time is 10 minutes.
Furthermore, the second preset time is 10 seconds.
Furthermore, the prediction of the ground attributes of the sub-satellite point at any of the time nodes comprises:
  Predicting the orbit position of the time node through orbit recursion on the satellite, and converting it to geographic longitude and latitude; and
  Determining the attributes of the land-sea model grid point nearest to the geographic longitude and latitude according to the global land-sea binarization model, and using this to represent the predicted value of the ground attribute of the sub-satellite point of the time node.
Furthermore, the global land-sea binarization model is obtained by binarization modeling from a global digital elevation model.
Furthermore, setting the observation arc segment comprises:
  If the ground attribute of the sub-satellite point predicted at continuous N time nodes is ocean, then setting the arc segment, where the continuous N time nodes are located, as non-observation arc segment, and setting the rest arc segments as observation arc segments, wherein the value of N is a preset value.
Furthermore, if the total number of non-observation arc segments K set within the observable arc segments exceeds M, then each non-observation arc segments are sorted according to the arc length, from long to short, and the non-observation arc segments of the sorted (M+1)th to Kth are set as observation arc segments.
Furthermore, determining the load power-on-off time sequence comprises:
  Powering-on the load within the observation arc segment; and
  Powering-off the load within the non-observation arc segment.

The present invention provides a method for autonomous mission planning of Carbon Satellite, at the starting moment of entering the light area in each orbit, the ground attributes of the sub-satellite point in the light area of the subsequent orbit are predicted, and the power-on-off sequence of the load is planned according to the prediction results, so as to realize the power-on observation over the land only under nadir observation mode, thus avoiding ineffective observation of the ocean, and then satellite storage, energy, data transmission resources and ground reception, storage and processing resources can be effectively saved.

BRIEF DESCRIPTION OF THE DRAWINGS

To further explain the above and other advantages and features of various embodiments of the present invention, more specific description of various embodiments of the present invention will be provided with reference to the accompanying drawings. It can be understood that these accompanying drawings depict only typical embodiments of the present invention, and therefore will not be considered as limiting their scope. In the accompanying drawings, identical or corresponding parts will be indicated by the same or similar reference numerals for the sake of clarity.

DETAILED DESCRIPTION OF EMBODIMENTS

Figure 1:
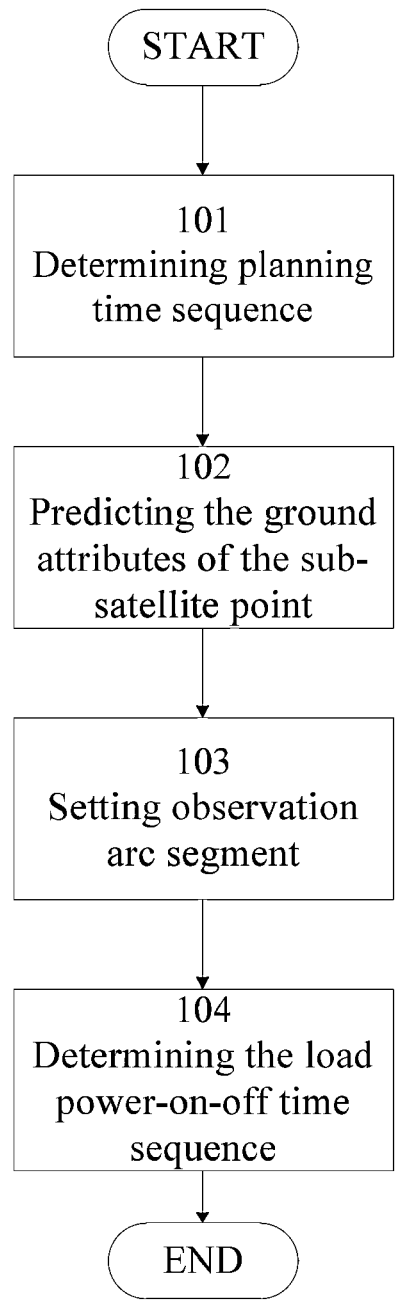
FIG. 1 illustrates a process flow schematic diagram of a method for autonomous mission planning of Carbon Satellite according to an embodiment of the present invention.

In the following description, the present invention is described with reference to various embodiments. However, those skilled in the art will recognize that various embodiments can be implemented without one or more specific details or with other alternative and/or additional methods.

In the present invention, the embodiments are merely intended to illustrate the scheme of the present invention and should not be construed as limiting.

In the present invention, the quantifiers "a" and "one" do not exclude scenarios with multiple elements, unless otherwise specified.

In this specification, a reference to "one embodiment" or "the embodiment" means that particular feature, structure or characteristic described in connection with the embodiment are included in at least one embodiment of the present invention. The phrase "in one embodiment" appearing throughout this description may not necessarily all referring to the same embodiment.

It should also be noted that, within the scope of the present invention, the terms "the same", "equal", "equal to", etc. do not mean that the two numerical values are absolutely equal, but rather allow for a certain reasonable error, that is to say, the terms also cover "substantially the same", "substantially equal" and "substantially equal to".

Existing carbon satellites usually operate at an orbital altitude of 700 km, and their orbits are low-orbit sun-synchronous circular orbits, and an orbital return period of 16 days. Therefore, at present, carbon satellites in orbit mostly adopt the working mode of 16-day nadir observation+16-day flare observation, wherein the nadir observation is mainly used to obtain the concentration of carbon dioxide columns over land, and flare observation is used to obtain the concentration of carbon dioxide columns over the ocean. Due to the signal-to-noise ratio at the sea surface of the ocean usually does not meet the observation requirements of the nadir observation, during the nadir observation period, the observation data over the ocean is invalid data.

In order to avoid ineffective observation of the ocean as much as possible, the present invention provides a method for autonomous mission planning of Carbon Satellite, in which, at the starting moment of entering the light area in each orbit, the ground attributes of the sub-satellite point in the light area of the subsequent orbit are predicted, and the power-on-off sequence of the load is planned according to the prediction results.

Wherein the observable arc segments are those arc segments in the light area that have the light conditions for the nadir observation. Due to the need for achieving the necessary signal-to-noise ratio for observation, sufficient energy of sunlight must be obtained, therefore, the solar zenith angle of the target point for the nadir observation should normally be less than 80 degrees. Taking the typical orbit of the carbon satellite as an example, FIG. 2 illustrates a schematic diagram of observable arc segment of a satellite.

Figure 2:
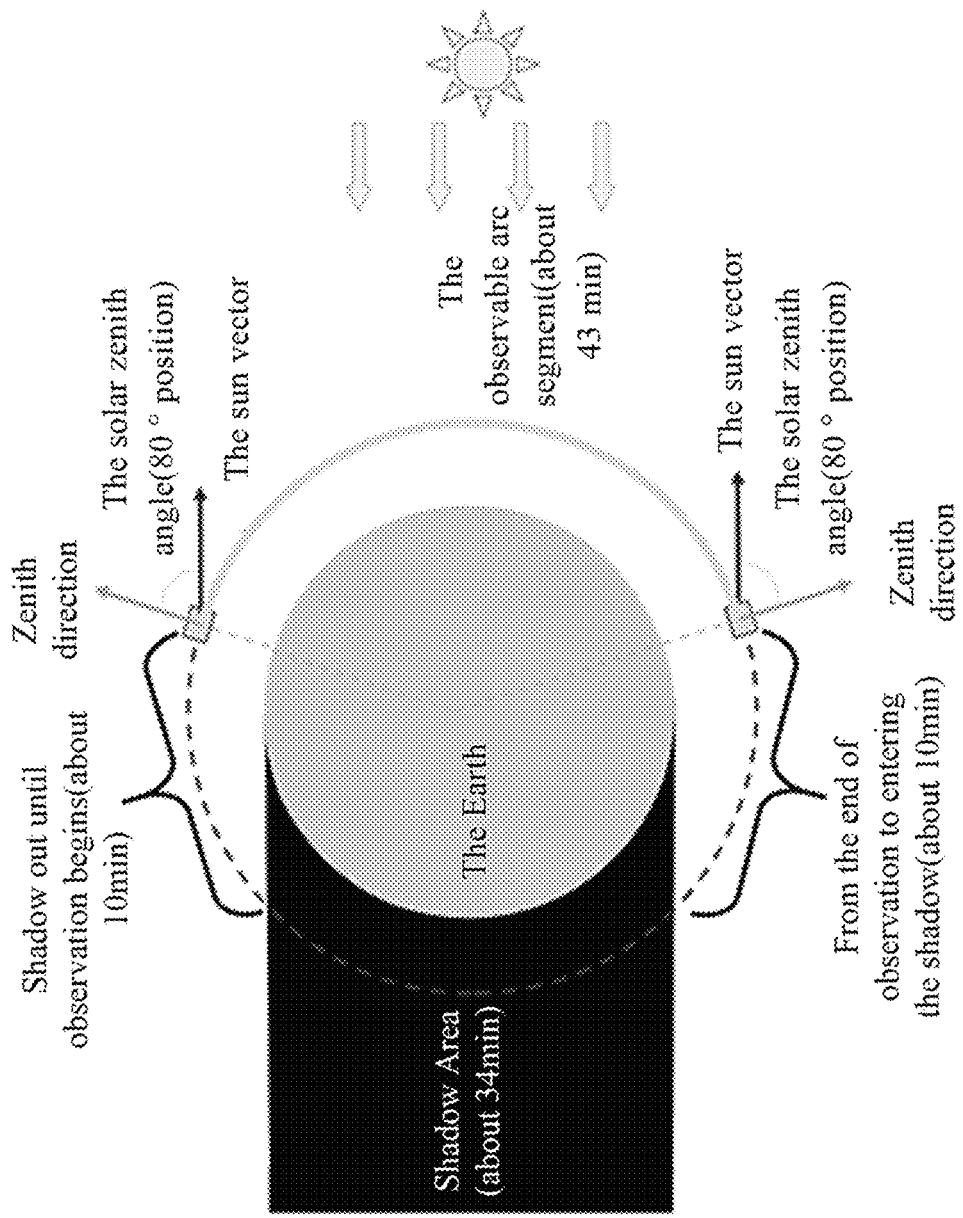
FIG. 2 illustrates a schematic diagram of observable arc segment of a satellite.

The satellite as shown in FIG. 2, operates in a 700 km low-orbit sun-synchronous circular orbit with an orbital period of about 97 min, and the duration of the light are is about 63 min. And according to the requirements of the solar zenith angle and orbital parameters of the nadir observation, it can be calculated that, the satellite as shown in FIG. 2 has the light conditions for the nadir observation from 10 minutes after entering the light area to 10 minutes before entering the shadow area again. Therefore, this period can be regarded as an observable arc segment, and the total duration of the corresponding observable arc segment is about 43 min.

The specific scheme of the present invention will be further described below in conjunction with the accompanying drawings of the embodiments.

FIG. 1 illustrates a process flow schematic diagram of a method for autonomous mission planning of Carbon Satellite according to an embodiment of the present invention. As shown in FIG. 1, a method for autonomous mission planning of Carbon Satellite comprising:

First, at step 101, a planning time sequence is determined. Autonomous mission planning for the satellite is triggered when it detects that the satellite switches from a shadow area to a light area, and the autonomous mission planning for the satellite first requires determining a planning time sequence. In one embodiment of the present invention, the planning time sequence includes several time nodes located within an observable arc segment. Specifically, in one embodiment of the present invention, the determination of the planning time sequence comprises:

Recording the time when the satellite is switched from the shadow area to the light area as $T_0^*$, then setting the time point after $T_0^*$ the first preset time as the initial time node $T_{p1}$, the first preset time is equal to the time required from the time when the satellite enters the light area to the time when the light condition for the nadir observation is available, and taking a typical 700 km low-orbit sun-synchronous circular orbit as an example, the value of the first preset time is taken as 10 minutes, then there are $T_{p1}=T_0^*+600$ s; and From the initial time node $T_{p1}$, setting the time point after the second preset time as the second time node $T_{p2}$, and so on, other time nodes in the planning time sequence $T_{p3}$ to $T_{pn}$ are set until the satellite leaves the observable arc segment, wherein the value of n is determined according to the duration of the observable arc segment and the interval between the individual time nodes. In one embodiment of the present invention, the intervals between the various time nodes are equal and take the value of 10 seconds, taking a typical 700 km low-orbit sun-synchronous circular orbit as an example, the satellite is in the observable arc segment for a total of 43 minutes, therefore, according to the calculation that the interval between each time node is 10 seconds, the planning time sequence contains 259 time nodes ($T_{p1}$, $T_{p2}$, ..., $T_{p259}$), wherein $T_{p1}=T_0^*+600$ s, $T_{p2}=T_0^*+610$ s, ..., $T_{p259}=T_0^*+3180$ s. It should be understood that in other embodiments of the present invention, the interval between each time node may also be other values, and the intervals between the time nodes may be equal or unequal;

In one embodiment of the present invention, the judgment of satellite in the shadow area and the light area is as follows:

If the continuous duration of detecting that the angle $\theta_{s\_u}$ between the sun vector and the geocentric vector is greater than the critical angle $\theta_{s\_u\_yuzhi}$ between light and shadow exceeds the specified value, then it is determined that the satellite switches from the shadow area to the light area, and in one embodiment of the present invention, the specified value takes the value of 10 seconds; and If the continuous duration of detecting that the angle $\theta_{s\_u}$ between the sun vector and the geocentric vector is less than the critical angle $\theta_{s\_u\_yuzhi}$ between light and shadow exceeds the specified value, then it is determined that the satellite switches from the light area to the shadow area, and in one embodiment of the present invention, the specified value takes the value of 10 seconds;

wherein the angle $\theta_{s\_u}$ between the sun vector and the geocentric vector takes a value between 0° and 180° and is satisfied:

$$\cos(\theta_{s\_u}) = \frac{R_i \cdot R_s}{|R_i| \cdot |R_s|}$$

Wherein, $R_i=(R_x, R_y, R_z)$ is the position vector of the satellite in the J2000 inertial frame at the current moment; and $R_s$ is the sun vector position vector in the J2000 inertial coordinate system; and The critical angle $\theta_{s\_u\_yuzhi}$ between light and shadow is calculated according to the minimum radius of the Earth $R_{e\_min}$, and the geocentric distance $R_{sat}$ of the satellite:

$$\theta_{s\_u\_yuzhi} = \arcsin\frac{R_{e\_min}}{R_{sat}}$$

Wherein, $R_{e\_min}$ Take the value 6356 km; and $R_{sat} = \sqrt{R_x^2 + R_y^2 + R_z^2}$ Next, at step 102, the ground attributes of the sub-satellite point are predicted. For each time node in the planning time sequence, the ground attributes of the sub-satellite points are predicted respectively, and sorted in chronological order to obtain the predicted value sequence of the ground attributes of the sub-satellite points. In one embodiment of the present invention, the predicted value sequence of the ground attributes of the sub-satellite points is a set of numerical sequences composed of 0, 1, wherein 0 represents that the ground attribute of the sub-satellite point of the corresponding time node is predicted to be ocean, and 1 represents that the ground attribute of the sub-satellite point of the corresponding time node is predicted to be land. In one embodiment of the present invention, the prediction of the ground attribute of the sub-satellite point at any of the time nodes $T_{pl}$, ($l \in [0, N]$) comprises:

Predicting the orbit position of the time node $T_{pl}$ through orbit recursion on the satellite, and converting it to geographic longitude and latitude ($J_{pl}$, $W_{pl}$); and Determining the attributes of the land-sea model grid point nearest to the (geographic longitude and latitude ($J_{pl}$, $W_{pl}$) according to the global land-sea binarization model, and using them to represent the predicted value of the ground attribute of the sub-satellite point of the time node $T_{pl}$. Wherein the global land-sea binarization model is obtained by binarization modeling from a global digital elevation model, specifically, the construction of the global land-sea binarization model comprises:

Utilizing the global digital elevation model to draw a global elevation map, and in one embodiment of the present invention, the grid precision of the global digital elevation model is 0.25°×0.25°, and the corresponding elevation data matrix size is 720×1440, and the data type is of the double type, therefore, the size of the elevation data is about 8 MB; and Performing binarization modeling on the global digital elevation model, wherein the land is represented as 1, and the ocean is represented as 0. Due to the storage resource on the satellite is limited, and at the same time, in the method for autonomous mission planning of Carbon Satellite provided by the present invention, there is no need to know the exact elevation value of each grid point, and it is only necessary to know whether it is an ocean or a land. Therefore, the model after binarization modeling can meet the requirements, and after binarization modeling, each grid point only needs 1 bit. Therefore, the data volume of the global land-ocean binarization model after binarization modeling is about 0.124 MB, which is only ¹⁄₆₄ of the original data volume;

Next, at step 103, an observation arc segment is set. The observation arc segment is set according to the predicted value sequence of the ground attributes of the sub-satellite point obtained in step 102. In one embodiment of the invention, the setting of the observation arc segment comprises:

If there are at least N consecutive "0" elements in the predicted value sequence of the ground attributes of the sub-satellite point, i.e., the ground attributes of the sub-satellite point predicted by at least continuous N time nodes are oceans, then it means that the sub-satellite points of the satellite are oceans in a longer time period. Therefore, nadir observation can be stopped in the corresponding time period. Therefore, the arc segment where the continuous N time nodes are located can be set as non-observation arc segment, and thus the arc segment where said continuous N time nodes are located may be set as a non-observation arc segment, and the rest arc segments are set as observation arc segments, wherein the value of N is a preset value. In one embodiment of the present invention, the N takes the value of 6, when the interval between the various time nodes is 10 seconds, then when the satellite's sub-satellite points are all oceans within a period of time of not less than 1 minute, the arc segment is set as a non-observation arc segment, and the rest of the arc segments are set as observation arc segments.

Considering that the load should not be powered on or off too frequently, therefore, in another embodiment of the invention, once no less than N consecutive "0" elements appear in the predicted value sequence of the ground attributes of the sub-satellite point exceeds the specified number M, i.e., when the total number of non-observation arc segments K set within the observable arc segment exceeds M, then each non-observation arc segments will be first sorted according to the arc length, from long to short, and then the non-observation arc segments of the sorted (M+1)th to Kth are set as observation arc segments. In one embodiment of the present invention, the M takes the value of 3, and N takes the value of 6, and the interval of each time node is 10 seconds, for example, when there are no less than 6 consecutive "0" elements in the predicted value sequence of the ground attributes of the sub-satellite point exceeds 3 times, the longest 3 arc segments are screened out, which are set as non-observation arc segments, and the rest arc segments are set as observation arc segments; and Finally, at step 104, the load power-on-off time sequence is determined. According to the observation arc segments, the load power-on-off time sequence is determined, specifically, the load is powered on within the observation arc segment; and the load is powered off within the non-observation arc segment.

The present invention provides a method for autonomous mission planning of Carbon Satellite, at the starting moment of entering the light area in each orbit, the ground attributes of the sub-satellite point in the light area of the subsequent orbit are predicted, and the power-on-off sequence of the load is planned according to the prediction results, so as to realize the power-on observation over the land only under nadir observation mode, avoiding ineffective observation of the ocean, and then satellite storage, energy, data transmission resources and ground reception, storage and processing resources can be effectively saved.

Although the various embodiments of the present invention have been described above, however, it should be understood that they are presented only as examples and not as limitations. It will be apparent to those skilled in the relevant art that various combinations, variations and changes can be made thereto without departing from the spirit and scope of the present invention. Therefore, the width and scope of the present invention disclosed herein should not be limited by the exemplary embodiments disclosed above, but should only be defined based on the accompanying claims and their equivalents.

What is claimed is:

1. A method for an autonomous mission planning of Carbon Satellite, an autonomous mission planning for the satellite when it detects the satellite switches from a shadow area to a light area, wherein the autonomous mission planning for the satellite comprising:
   determining a planning time sequence, wherein the planning time sequence comprise several time nodes;
   predicting ground attributes of a sub-satellite point for each of the several time nodes, and setting an observation arc segment according to the prediction result; and
   determining a load power-on-off time sequence according to the observation arc segment.

2. The method for the autonomous mission planning according to claim 1, wherein the detecting the satellite switches from the shadow area to the light area comprises:
   when a continuous duration of detecting that the angle between a sun vector and a geocentric vector is greater than a critical angle between light and shadow exceeds the specified value, determining that the satellite switches from the shadow area to the light area.

3. The method for the autonomous mission planning according to claim 1, wherein the determining the planning time sequence comprise:
   setting a time point after a first preset time of switching the satellite from the shadow area to the light area as an initial time node; and
   from the initial time node, setting the time point after a second preset time as a second time node, and so on, setting the time nodes in the planning time sequence until the satellite leaves the observable arc segment.

4. The method for the autonomous mission planning according to claim 3, wherein the first preset time is equal to the time required from the time when the satellite enters the light area to the time when a light condition for a nadir observation is available.

5. The method for the autonomous mission planning according to claim 3, wherein the second preset time is 10 seconds.

6. The method for the autonomous mission planning according to claim 1, wherein predicting the ground attributes of the sub-satellite point at a time node of the several time nodes comprises:
   predicting an orbit position of the time node through an orbit recursion on the satellite, and converting the orbit position to a geographic longitude and latitude; and
   determining an attribute of a land-sea model grid point nearest to the geographic longitude and latitude according to a global land-sea binarization model, and using the attribute to represent a predicted value of the ground attribute of the sub-satellite point of the time node.

7. The method for the autonomous mission planning according to claim 6, wherein the global land-sea binarization model is obtained by binarization modeling from a global digital elevation model.

8. The method for the autonomous mission planning according to claim 1, wherein the setting the observation arc segment comprises:
   in response to the ground attribute of the sub-satellite point predicted by continuous N time nodes is ocean, setting the arc segment where the continuous N time nodes are located as a non-observation arc segment, and setting the rest arc segments as observation arc segments, wherein the value of N is a preset value.

9. The method for the autonomous mission planning according to claim 8, wherein in response to the total number K of the non-observation arc segments set within the observable arc segments exceeds M, each of the non-observation arc segments is sorted according to an arc length, from long to short, and the non-observation arc segments of the sorted (M+1)th to Kth are set as the observation arc segments.

10. The method for the autonomous mission planning according to claim 8, wherein the determination the load power-on-off time sequence comprises:
    powering-on the load within the observation arc segment; and
    powering-off the load within the non-observation arc segment.

* * * * *